Patented Jan. 6, 1925.

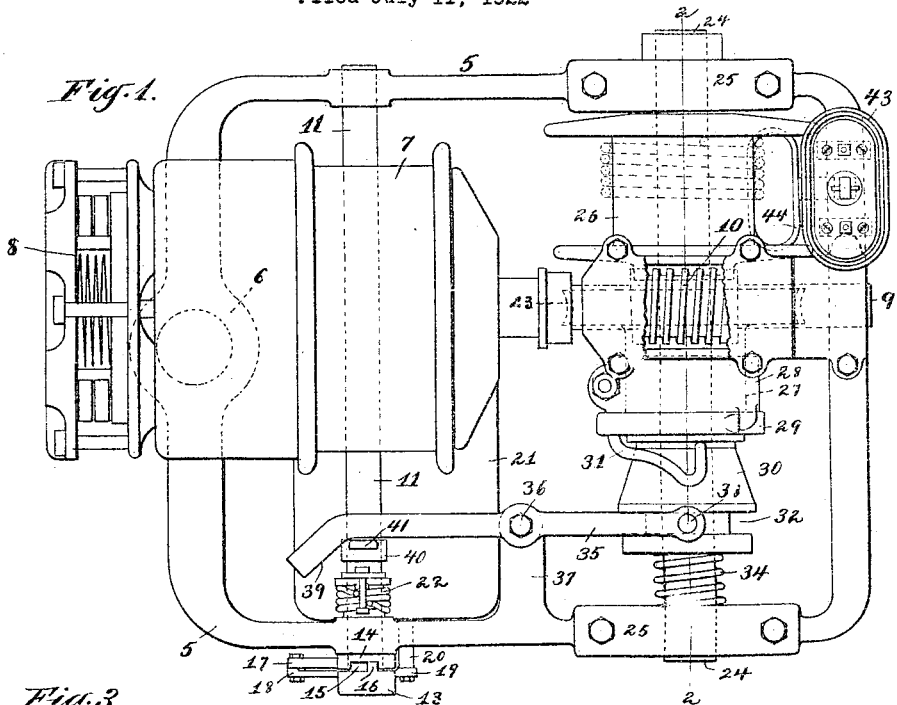

1,522,462

UNITED STATES PATENT OFFICE.

JOSEPH H. DONAT, OF NEW YORK, N. Y., ASSIGNOR TO GILLIS & GEOGHEGAN, OF NEW YORK, N. Y., A FIRM.

HOISTING MECHANISM.

Application filed July 11, 1922. Serial No. 574,235.

*To all whom it may concern:*

Be it known that I, JOSEPH H. DONAT, a citizen of the United States, residing in the city of New York, borough and county of Queens, in the State of New York, have invented a certain new and useful Improvement in Hoisting Mechanism, of which the following is a specification.

The invention relates to power driven hoisting mechanism and more particularly to ash-hoists operated electrically and designed to raise ash cans and like loads from a cellar to the sidewalk, of the type shown in Letters Patent of the United States granted to Joseph H. Donat, dated March 9, 1920, No. 1,333,064, upon which the present invention is based.

The object of the invention is to provide simplified and less expensive mechanism for performing the required operations as set forth in the above Letters Patent, and the invention consists in certain novel features and details of construction by which the above and other objects are attained, to be hereinafter described and claimed.

The accompanying drawings form a part of this specification and show the invention as it has been carried out in practice.

Figure 1 is a plan view of a hoisting head constructed in accordance with the invention.

Figure 2 is a vertical transverse section through a portion of such head, taken on the line 2—2 in Figure 1.

Figure 3 is a side elevation of the controlling lever and certain other portions, partly in vertical section.

Similar reference numerals indicate the same parts in all the figures.

The horizontally disposed frame of the head is marked 5 and has a cylindrical boss 6 disposed vertically adapted to be mounted upon a standard, not shown, which may be understood to be as usual and equipped with elevating and lowering means of suitable construction.

Mounted on the frame is an electric motor 7 having a magnetic brake mechanism 8, and a motor shaft 9 carrying at its outer end a worm 10. The motor is controlled by the movements of a transverse operating shaft 11 mounted in the frame 5 and oscillated by a controlling lever 12 having a boss 13 keyed upon the overhung end of the shaft 11.

Between the boss 13 and the frame is a collar 14 loosely mounted on the operating shaft 11, having a wide notch 15 in its face receiving a narrower lug 16 on the adjacent face of the boss 13, the arrangement being such that a movement of the controlling lever to the left will partially rotate the collar 14 with the shaft 11 while the collar will be unaffected by a movement of the lever to the right within the limits offered by the length of the notch 15. On the collar is an arm 17 projecting radially, connected by a link 18 to a crank-arm 19 on the controller shaft 20 extending into the controller-box 21 and operating a switch, not shown, in the latter and controlling the current to the motor 7. This mechanism is similar to that shown in Patent No. 1,452,964, dated April 24, 1923 issued to Arthur Falkenau, and, with the spring-actuated mechanism 22 on the operating shaft 11 for automatically returning the controlling lever 12 to the central or neutral position, is fully shown and described in such application. For this purpose the controller shaft 20 is provided with a spring-actuated mechanism not shown, but similar to the above-mentioned spring-actuated mechanism 22, located within the controller box 21, for returning the controller shaft to the neutral normal position when free and correspondingly moving the collar 14 to the neutral position shown in Figure 1.

The worm engages the teeth of a wormwheel 23 loosely mounted on the hoisting shaft 24 extending transversely of the frame 5 and supported in bearings at 25 thereon in which it is free to rotate.

Adjacent the wormwheel 23 on one side, is a flanged hoisting-drum 26 keyed on the shaft 24 to revolve therewith, and on the opposite side of the wormwheel is a drum or hub 27 engaged by a friction band 28 forming part of a clutch 29 keyed on the shaft 24 and operated by a cone 30 slidably mounted on the shaft. By the movements of the cone relatively to the clutch arm 31, the frictional engagement of the band 28 with the wormwheel 23 is varied. The clutch shown is known as the "Conway" and is preferred, but any suitable friction clutch may be employed.

The cone 30 has an annular groove 32 in its base, and is recessed at 33 to receive one end of a helical expansion spring 34 encircling the shaft 24 and abutting at one end against the frame 5 and at the other against the cone, exerting its force in the direction to hold the clutch normally in strong frictional engagement with the hub 27 of the wormwheel 23 and cause the latter to rotate the hoisting shaft 24 and its hoisting-drum 26 when thus engaged.

The cone is moved axially toward the wormwheel in opposition to the force of the spring 34 by a horizontally disposed forked shifting lever 35 pivotally mounted at 36 on an arm 37 projecting inwardly from the frame 5, and having pins 38 lying in the groove 32 of the cone. The opposite end of the lever 35 extends above the operating shaft 11 and has an outwardly inclined angular face, as at 39.

On the operating shaft 11 is fixed a collar 40 having an upwardly extending arm 41 standing adjacent the inclined end 39 of the shifting lever and arranged to contact with the angular face of the latter when the controlling lever 12 is thrown to the right and thus swing the shifting lever and move the cone in the direction to release the grip of the band 28 on the hub 27 and permit the hoisting shaft 24 to turn independently of the wormwheel 23 in the direction to lower the load suspended by a cable 42, shown in dotted lines in Figure 1, wound upon the hoisting-drum 26.

The operation is as follows:—Assuming a load to be raised, the controlling lever 12 is swung to the left which movement by the engagement of the lug 16 with the collar 14 turns the latter and through the connections 17, 18 and 19 turns the controller shaft 20 and throws the switch, not shown, in the controller box 21 in the direction to supply current and actuate the motor to turn the wormwheel 23. The latter is loose on the hoisting shaft 24 but as the clutch 29 is keyed on the shaft and is held in strong frictional engagement with the wormwheel by the force of the spring 34, the shaft is caused to rotate carrying with it the hoisting drum keyed thereon and the load is lifted.

When the controlling lever 12 is returned to the central or neutral position the current will be cut off and the load remain stationarily suspended by the engagement of the now stationary worm 10 with the wormwheel 23, the magnetic brake mechanism 8 aiding to resist rotation of the motor shaft under these conditions.

In lowering the load the controlling lever 12 is swung to the right, the lost motion afforded by the notch 15 and lug 16 permitting such movement without imparting motion to the controller shaft 20, and the action of the arm 41 on the inclined end 39 of the shifting lever 35 swings the latter and slides the cone 30 in opposition to the spring 34 to release the grip of the clutch on the wormwheel and permit the hoisting shaft to rotate in the reverse direction by the unwinding of the cable and the load descends by gravity. By manipulating the controlling lever to vary the grip of the friction band 28 on the now stationary hub 27 of the wormwheel, the rapidity of such descent may be correspondingly governed or the descent checked when desired. The band and hub thus serve as a variable brake for the hoisting shaft in the lowering operation.

The hoisting and lowering is controlled by the single lever 12, and if by accident or otherwise the lever be released it will automatically assume the neutral position and hold the load suspended until the lever is again swung to raise or lower it.

The mechanism is simple and economical both in construction and operation and can be successfully and efficiently operated by unskilled persons, without danger of accident.

To avoid overwinding the cable in the hoisting operation a limit device is added consisting of a circuit breaker contained in the casing 43 operated by the contact of the load or its suspending hook with a loop 44 through which the cable passes, on reaching the limit of the upward movement, and arranged to break the current when the load has risen to the predetermined height.

Although the mechanism as shown and described includes a loose wormwheel and a fixed hoisting drum with a fixed clutch member arranged to engage the wormwheel frictionally, it will be understood that the wormwheel may be keyed to the shaft and the clutch arranged to engage a loosely mounted hoisting drum without affecting the successful operation.

I claim:—

1. In a mechanism of the character set forth, a hoisting shaft having mounted thereon a wormwheel, a hoisting drum and a friction clutch, a motor, a motor shaft having a worm in mesh with said wormwheel, an operating shaft, and connections therefrom for controlling said motor, a shifting lever for said clutch, a controlling lever, an arm movable therewith to engage said shifting lever, said controlling lever mounted for oscillating said operating shaft, said controlling lever being adapted in one position to actuate said motor and hoist a load, in another position to stop said motor and hold the load suspended, and in another position to permit the load to lower by gravity and to control such lowering movement frictionally by said clutch.

2. In a mechanism of the character set forth, a hoisting shaft, a hoisting drum, a worm wheel, and a friction clutch all mounted on said shaft, an oscillatory member having one end disposed to control said clutch and its other end angularly disposed, a motor, a worm thereon cooperating with the worm wheel, an operating shaft, an actuating lever therefor, and means carried by said operating shaft and operable by said lever to engage the angular portion of said oscillatory member.

3. In a mechanism of the character set forth, a hoisting shaft, a hoisting drum, a worm wheel, a friction clutch all mounted on said shaft, an oscillatory member having one end disposed to control said clutch and its other end angularly disposed, a motor, a worm thereon cooperating with the worm wheel, an operating shaft, an actuating lever therefor, means carried by said operating shaft and operable by said lever to engage the angular portion of said oscillatory member, and motor controlling means controlled by said lever.

In testimony that I claim the invention above set forth I affix my signature.

JOSEPH H. DONAT.